(12) United States Patent
Iida et al.

(10) Patent No.: US 6,901,980 B2
(45) Date of Patent: Jun. 7, 2005

(54) TIRE/WHEEL ASSEMBLY AND RUN-FLAT SUPPORT MEMBER

(75) Inventors: Eiichi Iida, Hiratsuka (JP); Shinya Harikae, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 106 days.

(21) Appl. No.: 10/642,162

(22) Filed: Aug. 18, 2003

(65) Prior Publication Data

US 2004/0035513 A1 Feb. 26, 2004

(30) Foreign Application Priority Data

Aug. 23, 2002 (JP) ........................................ 2002-243401

(51) Int. Cl.⁷ .............................................. B60C 17/06
(52) U.S. Cl. ........................ 152/156; 152/158; 152/520
(58) Field of Search ................................. 152/156, 158, 152/520, 248, 249

(56) References Cited

U.S. PATENT DOCUMENTS

2004/0025994 A1 * 2/2004 Seko et al. ................. 152/156

FOREIGN PATENT DOCUMENTS

| JP | 10-297226 A1 | 11/1998 |
|----|--------------|---------|
| JP | 2001-163020 A1 | 6/2001 |
| JP | 2001-519279 A1 | 10/2001 |

* cited by examiner

Primary Examiner—Adrienne C. Johnstone
(74) Attorney, Agent, or Firm—Rader, Fishman & Grauer PLLC

(57) ABSTRACT

Disclosed are a tire/wheel assembly and a run-flat support member which are designed to be lightened without losing durability during run-flat traveling. The tire/wheel assembly is constituted as follows: a pneumatic tire is fit to a wheel rim; and the run-flat support member constituted of a circular shell and elastic rings is inserted into a cavity of the pneumatic tire. The circular shell has a support surface thereof extended toward the periphery of the pneumatic tire and leg portions along each side of the support surface. The elastic rings support the leg portions of the circular shell on the rim. In the tire/wheel assembly, contact portions and noncontact portions for the circular shell are alternately formed on the elastic rings in a shell circumferential direction.

10 Claims, 2 Drawing Sheets

TIRE/WHEEL ASSEMBLY AND RUN-FLAT SUPPORT MEMBER

BACKGROUND OF THE INVENTION

The present invention relates to a tire/wheel assembly which enables run-flat traveling and to a run-flat support member employed therein. More specifically, the present invention relates to a tire/wheel assembly and a run-flat support member, which are designed to be lightened without losing durability thereof for run-flat traveling.

To meet the demand from the market, numerous techniques have been proposed to enable a certain degree of emergency traveling even when a pneumatic tire is punctured while driving a vehicle. Among those numerous proposals, the techniques proposed in Japanese Patent Laid-Open Publication No. 10-297226 and Published Japanese Translation of a PCT Application No. 2001-519279 enable run-flat traveling by fitting a core to a rim in a cavity of an assembled pneumatic tire and supporting a flat tire with the core.

The foregoing run-flat core has an open-leg-structured circular shell including a support surface thereof extended toward the periphery of the tire and leg portions along each side of the support surface. The run-flat core is constituted by having elastic rings attached to both of these leg portions so that the core is supported on a rim through the elastic rings. The advantage of the run-flat core is that the available rims and wheels in the market can be used as their own, without any particular modification. Thus, the core can be accepted to the market without causing difficulties therein.

The run-flat core is required to be lightened to the maximum feasible extent since the run-flat core is a factor in increasing the vehicle weight. However, it is difficult for the run-flat core to exhibit satisfactory strength if the run-flat core is merely thinned. For example, if the elastic rings are thinned in a shell axial direction, the circular shell will be unstably supported by the elastic rings. Thus, durability of the run-flat core for run-flat traveling is reduced. In addition, the elastic rings are required to be capable of supporting a load in a shell radial direction during run-flat traveling. However, at the same time, the elastic rings are required to be excellent in the workability in tire-to-rim fit, in which the elastic rings have low resistance to bending deformation in the shell axial direction when fitting the tire to the rim.

SUMMARY OF THE INVENTION

An object of the present invention is to provide a tire/wheel assembly and a run-flat support member which are enabled to be lightened without losing durability thereof for run-flat traveling.

The tire/wheel assembly of the present invention which achieves the foregoing object is constituted as follows: a pneumatic tire is fit to a wheel rim; and a run-flat support member constituted of a circular shell and elastic rings is inserted into a cavity of the pneumatic tire. The circular shell has a support surface thereof extended toward the periphery of the pneumatic tire and leg portions along each side of the support surface. The elastic rings support the leg portions of the circular shell on the rim. The tire/wheel assembly is characterized by that both contact portions and noncontact portions for the circular shell are alternately formed on the elastic rings in a shell circumferential direction.

Moreover, the run-flat support member of the present invention is constituted of a circular shell and elastic rings.

The circular shell has a support surface thereof extended toward the periphery of a pneumatic tire and leg portions along each side of the support surface. The elastic rings support the leg portions of the circular shell on the rim. The run-flat support member is characterized by that both contact portions and noncontact portions for the circular shell are alternately formed on the elastic rings in a shell circumferential direction.

In the present invention, the outer diameter of the run-flat support member is formed to be smaller than the inner diameter of a tread of the pneumatic tire so that a constant distance is maintained between the run-flat support member and the pneumatic tire. Moreover, the inner diameter of the run-flat support member is formed to have substantially the same size as the inner diameter of bead partion of the pneumatic tire. The run-flat support member as well as the pneumatic tire are fit to the wheel rim while the run-flat support member is inserted into the cavity of the pneumatic tire, thereby constituting the tire/wheel assembly. The tire/wheel assembly is attached to a vehicle. When the pneumatic tire is punctured while driving, the punctured deflated tire is supported by the support surface of the circular shell of the run-flat support member. Therefore, the run-flat traveling is enabled.

According to the present invention, the contact portions and the noncontact portions for the circular shell are alternately formed on the elastic rings in the shell circumferential direction. Thus, it is possible to lighten the run-flat support member without losing stability of the circular shell supported by the elastic rings, and without losing durability thereof for run-flat traveling. In addition, the elastic rings on which the shell contact portions and the shell noncontact portions are formed have less resistance to bending deformation in the shell axial direction. As a result, the workability in tire-to-rim fit of the run-flat support member can be enhanced.

In the present invention, the percentage of depths of the shell noncontact portions on the elastic rings is preferably 20 to 80% with respect to heights of the shell contact portions in a shell radial direction. In this way, it is possible to lighten the run-flat support member while the run-flat support member is ensured sufficient load supporting capabilities.

The inner circumferential surfaces of the elastic rings are preferably laminated with protection layers made of metal or synthetic resin. In this way, the elastic rings can be easily fit to the rim while protecting the inner circumferential surfaces of the elastic rings.

Load supporting auxiliary members are preferably added between the shell noncontact portions of the elastic rings and the circular shell. In this way, load supporting capabilities of the elastic rings can be reinforced without reducing the lightening effect. The auxiliary members are preferably made of synthetic resin, especially to prevent the lightening effect from being reduced.

BRIEF DESCRIPTION OF THE DRAWINGS

FIG. 1 is a cross-sectional view along the meridian showing an essential part of a tire/wheel assembly formed in an embodiment of the present invention.

FIG. 2 is a perspective view showing a joint portion between a circular shell and an elastic ring of a run-flat support member of the present invention.

FIG. 3 is a partial exploded side view showing a different example of the joint portion between the circular shell and the elastic ring of the run-flat support member of the present invention.

Figure 4:
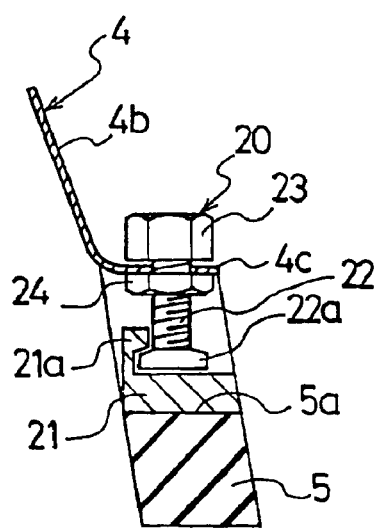
Figure 4:
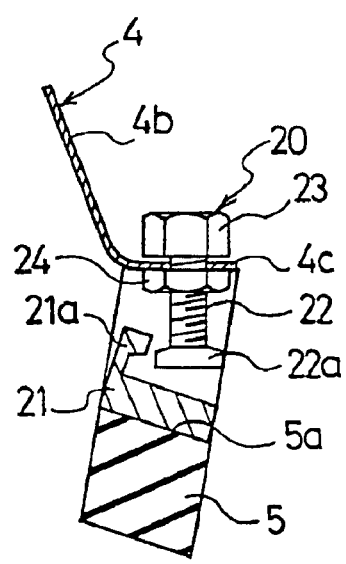

FIGS. 4(a) and 4(b) show another different example of the joint portion between the circular shell and the elastic ring of the run-flat support member of the present invention. FIG. 4(a) is a sectional view showing the joint portion when supporting a load. FIG. 4(b) is a sectional view showing the joint portion when fitting a tire to a rim.

DETAILED DESCRIPTION OF THE PREFERRED EMBODIMENTS

The present invention is detailed below with reference to the attached drawings.

Figure 1:
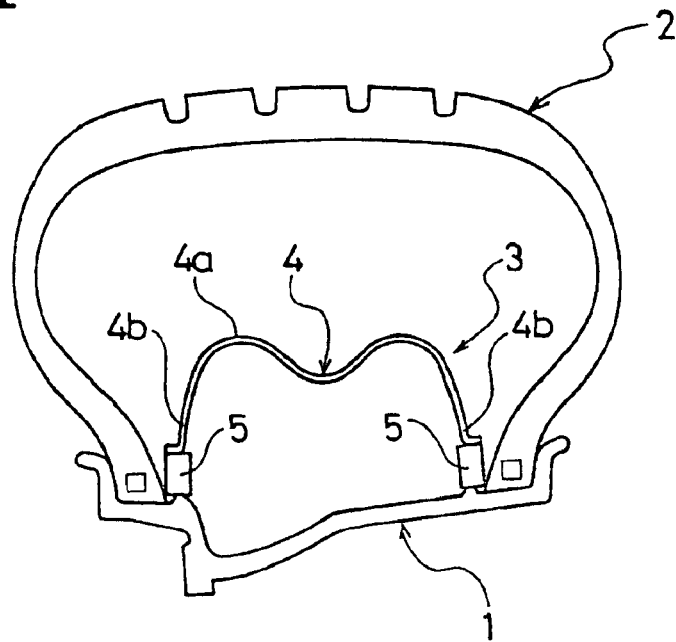

FIG. 1 is a cross-sectional view along the meridian showing an essential part of a tire/wheel assembly (a wheel) formed in an embodiment of the present invention. Reference numerals 1, 2 and 3 denote a wheel rim, a pneumatic tire and a run-flat support member, respectively. These rim 1, pneumatic tire 2 and run-flat support member 3 are formed in a circle around a wheel rotation axis (not shown).

A circular shell 4 and the elastic rings 5 constitute a main part of the run-flat support member 3. The run-flat support member 3 is separated from the inner wall of the pneumatic tire 2 under normal driving conditions. The run-flat support member 3 supports the pneumatic tire 2 from the inside when the pneumatic tire 2 is punctured and deflated.

The circular shell 4 has an open leg structure in which a continuous support surface 4a for sustaining the flat tire is extended toward the periphery of the tire (outer radial direction), and leg portions 4b and 4b are provided along each side of the support surface 4a. The support surface 4a of the circular shell 4 is shaped so that the support surface 4a has a convexly curved portion toward the periphery of the tire at a cross section orthogonal to the circumferential direction. A minimum of one convexly curved portion is required, but two or more convexly curved portions are preferably aligned in a tire axial direction. Thus, the support surface 4a of the circular shell 4 is formed by aligning two or more convexly curved portions. Accordingly, two or more portions in contact with the inner wall of the tire can be dispersed on the support surface 4a, and localized wear of the inner wall of the tire can be reduced. Therefore, it is possible to extend a distance which a vehicle endures run-flat traveling.

The foregoing circular shell 4 is made of a rigid material in order to sustain the vehicle weight through the flat pneumatic tire 2. Metal, resin and the like are used for the constituent material. Steel and aluminum may be exemplified as the metal. As for the resin, both thermoplastic resin and thermosetting resin can be used. Examples of thermoplastic resin are nylon, polyester, polyethylene, polypropylene, polystyrene, polyphenylene sulfide and ABS. Examples of thermosetting resin are epoxy resin and unsaturated polyester resin. Resin can be used as single or fiber reinforced resin by blending reinforcing fiber.

The elastic rings 5 are respectively attached to leg portions 4b and 4b of the circular shell 4. The elastic rings 5 are abutted on bilateral rim seats to support the circular shell 4. These elastic rings 5 alleviate impact on the circular shell 4 when the pneumatic tire 2 is punctured and vibration of the circular shell 4 caused by the same. Additionally, the elastic rings 5 prevent the circular shell 4 from slipping on the rim seats to stably support the circular shell 4.

Rubber and resin can be used as a constituent material of the elastic rings 5, and it is more preferable to use the rubber. Examples of types of rubber are natural rubber (NR), isoprene rubber (IR), styrene-butadiene rubber (SBR), butadiene rubber (BR), hydrogenated nitrile-butadiene rubber, hydrogenated styrene-butadiene rubber, ethylene propylene rubber (EPDM, EPM), isobutylene-isoprene rubber (IIR), acrylic rubber (ACM), chloroprene rubber (CR), silicone rubber and fluoro rubber. As a matter of course, it is possible for these types of rubber to be blended with an additive such as filler, vulcanizer, vulcanization accelerator, softener and antioxidant as appropriate. Accordingly, a desired elastic modulus can be obtained based on the blend of the rubber components.

In the tire/wheel assembly thus constituted, when the pneumatic tire 2 is punctured while driving a vehicle, the support surface 4a of the circular shell 4 of the run-flat support member 3 supports the deflated pneumatic tire 2. Thus, run-flat traveling is enabled.

Figure 2:
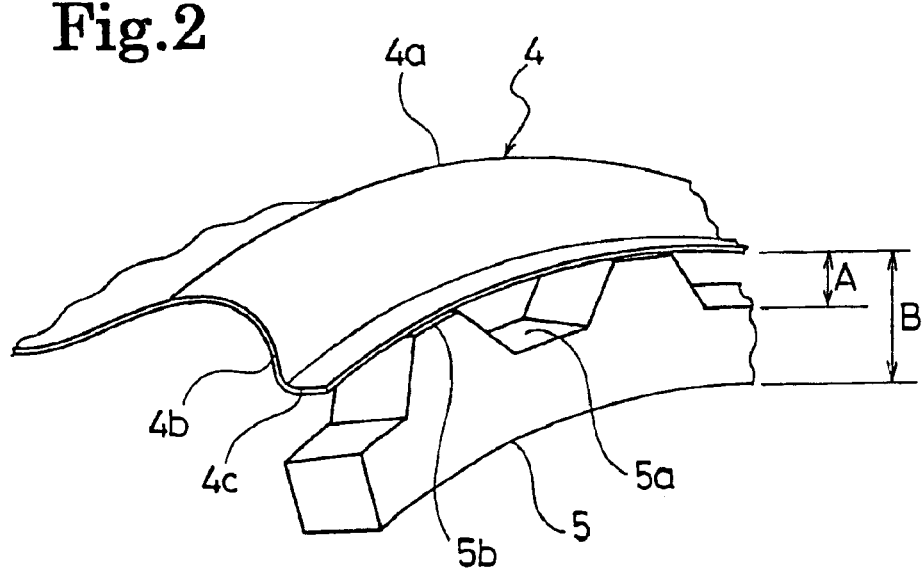

FIG. 2 shows an essential part of the run-flat support member. As shown in FIG. 2, the leg portion 4b of the circular shell 4 includes a flange 4c which is bent toward an outer shell axial direction. Meanwhile, a contact portion 5b (a shell contact portion) and a noncontact portion 5a (a shell noncontact portion) for the flange 4c of the circular shell 4 are alternately formed on the elastic ring 5 at a regular interval in a shell circumferential direction. In other words, the outer circumferential surface of the elastic ring 5 is molded in a gear shape. The shell contact portion 5b of the elastic ring 5 can be adhered to the flange 4c of the circular shell 4 with an adhesive or the like or through vulcanization.

As described above, the shell contact portions 5b and the shell noncontact portions 5a are alternately provided on the elastic rings 5 in the shell circumferential direction. Thus, the run-flat support member 3 can be lightened without unstable support of the circular shell 4 by the elastic rings 5. In addition, when fitting the run-flat support member 3 as well as the pneumatic tire 2 to the rim, the elastic rings 5 are easily deformed in the shell axial direction owing to the shell noncontact portion 5a. Therefore, the tire/wheel assembly having the run-flat support member 3 has excellent workability in tire-to-rim fit.

The percentage (A/B) of depths A of the shell noncontact portions 5a on the elastic rings 5 is to be set in a range from 20 to 80% with respect to heights B of the shell contact portions 5b in a shell radial direction. The percentage is preferably set in a range from 40 to 50%. An extremely small percentage will make the lightening effect unsatisfactory. On the other hand, an extremely large percentage will make load supporting capabilities insufficient.

Figure 3:
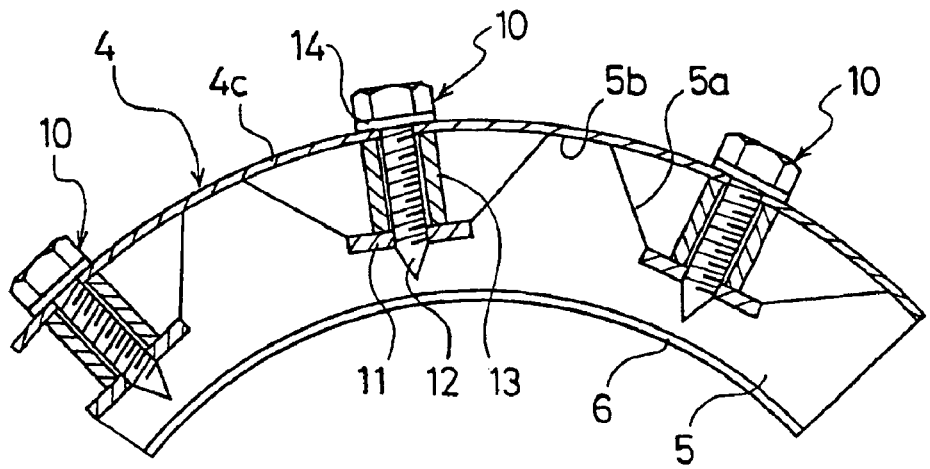

FIG. 3 shows a different example of the run-flat support member. As shown in FIG. 3, the inner circumferential surface of the elastic ring 5 is laminated with a protection layer 6 made of metal or synthetic resin. Thus, by providing the protection layer 6 on the inner circumferential surface of the elastic ring 5, the elastic ring 5 can be easily fit to the rim 1 while protecting the inner circumferential surface of the elastic ring 5.

Moreover, load supporting auxiliary members 10 are provided between the shell noncontact portions 5a of the elastic ring 5 and the flanges 4c of the circular shell 4. The auxiliary member 10 includes a reinforcing plate 11, a bolt 12 and a cylindrical spacer 13. The reinforcing plate 11 is embedded in the shell noncontact portion 5a of the elastic ring 5 and provided with a screw hole. The bolt 12 penetrates the flange 4c of the circular shell 4 to fit the screw hole of the reinforcing plate 11. The spacer 13 is disposed around the bolt 12 to define an interval between the reinforcing plate 11 and the flange 4c of the circular shell 4.

The auxiliary member 10 assists to support a load applied on the circular shell 4 and functions to improve the durability for run-flat traveling, but does not thoroughly cancel the lightening effect. For example, although the spacer 13 can be made of metal, the auxiliary member 10 is preferably made of synthetic resin to prevent the lightening effect from being reduced. Note that reduction in the workability of the tire-to-rim fit can be definitely avoided by inserting a rubber washer 14 between the head of the bolt 12 and the flange 4c of the circular shell 4.

FIGS. 4(a) and 4(b) show another different example of the run-flat support member. As shown in FIGS. 4(a) and 4(b), a load supporting auxiliary member 20 is provided between the shell noncontact portion 5a of the elastic ring 5 and the flange 4c of the circular shell 4. This auxiliary member 20 includes a base 21, a bolt 22, and a pair of nuts 23 and 24. The base 21 is attached to the shell noncontact portion 5a of the elastic ring 5. The bolt 22 penetrates the flange 4c of the circular shell 4. The nuts 23 and 24 fasten the bolt 22 to the flange 4c. The bolt 22 has a bolt seat 22a in larger diameter than that of the bolt 22. The base 21 has a hook 21a which locks the bolt seat 22a at farther inner shell axial direction than the bolt 22. Thus, the hook 21a and the bolt seat 22a are locked to each other.

In this embodiment, when the run-flat support member 3 and the rim 1 are fit, the hook 21a and the bolt seat 22a are meshed as shown in FIG. 4(a). As a consequence, load supporting is appropriately performed during run-flat traveling. Meanwhile, when fitting the run-flat support member to the rim, the mesh between the hook 21a and the bolt seat 22a is released if the elastic ring 5 is bent to be deformed in the shell axial direction. Thus, the shell noncontact portion 5a of the elastic ring 5 as well as the base 21 are easily separated from the bolt 22. Moreover, when the elastic ring 5 is seated on the bead seat of the rim 1, the hook 21a and the bolt seat 22a are re-meshed. In other words, by the auxiliary member 20, load supporting capabilities of the elastic ring 5 can be reinforced, hardly losing the workability of the tire-to-rim fit.

EXAMPLE

A tire/wheel assembly in which a pneumatic tire with a tire size of 205/55R16 89V and a wheel with a rim size of 16×6 1/2JJ are fit was prepared. A 1.0 mm-thick steel plate was processed to create a circular shell, and a run-flat support member was made as shown in FIG. 2, in which contact portions and non-contact portions for the circular shell are alternately formed on the elastic ring in a shell circumferential direction. The run-flat support member was inserted into a cavity of the pneumatic tire. Thus, the tire/wheel assembly (an example of an embodiment) was created.

For comparison, the run-flat support member in which the elastic ring is in contact with the entire periphery of the circular shell was created. Other than employment of the run-flat support member, the tire/wheel assembly (a conventional example) having the same structure as the assembly of the embodiment was obtained.

Durability and a lightening effect of the two types of the tire/wheel assemblies were evaluated by the following measurement method for run-flat traveling, and the results thereof are listed on Table 1.

[Durability for Run-Flat Traveling]

A tire/wheel assembly to be tested was fit in the right front wheel of a front engine/rear wheel drive car with an engine displacement of 2.5 liter. The inner pressure of the tire was set to 0 kPa (200 kPa for the other tires), and the car was driven counterclockwise at 90 km/h in a circular circuit. A distance that the car was driven was measured until the car became incapable of being driven. The results of evaluation are indicated by index numbers, where the conventional example is set to 100. The larger the index number is, the better the durability during run-flat traveling is.

[Lightening Effect]

A weight of each run-flat support member was measured. The results of evaluation are indicated by index numbers with use of a reciprocal of the measured value, where the conventional example is set to 100. The larger the index value is, the larger the lightening effects are.

TABLE 1

|  | Conventional Example | Embodiment |
| --- | --- | --- |
| Presence of Shell Noncontact Portion on Elastic Ring | Absent | Present |
| Durability During Run-Flat Traveling | 100 | 100 |
| Lightening Effect | 100 | 105 |

As shown in Table 1, the tire/wheel assembly of the embodiment could gain a large lightening effect, hardly reducing the durability for run-flat traveling with respect to the conventional example.

According to the present invention, the run-flat support member is constituted of a circular shell and elastic rings. The circular shell has a support surface thereof extended toward the periphery of a pneumatic tire and leg portions along each side of the support surface. The elastic rings support the leg portions of the circular shell on a rim. In the run-flat support member, contact portions and noncontact portions for the circular shell are alternately formed on the elastic ring in a shell circumferential direction. Thus, the run-flat support member can be lightened without losing the durability thereof during run-flat traveling.

Hereinbefore, the preferred embodiments of the present invention have been detailed. It is to be understood that various modifications, substitutions and replacements can be made without departing from the spirit and scope of the present invention defined by the appended claims.

What is claimed is:

1. A tire/wheel assembly, in which a pneumatic tire is fit to a wheel rim, including:
   a run-flat support member constituted of a circular shell and elastic rings and inserted into a cavity of the pneumatic tire, the circular shell having a support surface thereof extended toward a periphery of the pneumatic tire and leg portions along each side of the support surface, and the elastic rings supporting the leg portions of the circular shell on the rim,
   wherein contact portions and noncontact portions for the circular shell are alternately formed on the elastic rings in a shell circumferential direction.

2. The tire/wheel assembly according to claim 1, wherein the percentage of depths of the shell noncontact portions on the elastic rings is 20 to 80% of heights of the shell contact portions in a shell radial direction.

3. The tire/wheel assembly according to claim 1, wherein inner circumferential surfaces of the elastic rings are laminated with protection layers made of metal or synthetic resin.

4. The tire/wheel assembly according to any one of claims 1 to 3, wherein load supporting auxiliary members are provided between the shell noncontact portions of the elastic rings and the circular shell.

5. The tire/wheel assembly according to claim 4, wherein the auxiliary members are made of synthetic resin.

6. A run-flat support member, comprising:

a circular shell having a support surface thereof extended toward a periphery of a pneumatic tire and leg portions along each side of the support surface; and elastic rings supporting the leg portions of the circular shell on a rim, wherein contact portions and noncontact portions for the circular shell are alternately formed on the elastic rings in a shell circumferential direction.

7. The run flat support member according to claim 6, wherein the percentage of depths of the shell noncontact portions on the elastic rings is 20 to 80% of heights of the shell contact portions in a shell radial direction.

8. The run-flat support member according to claim 6, wherein inner circumferential surfaces of the elastic rings are laminated with protection layers made of metal or synthetic resin.

9. The run-flat support member according to any one of claims 6 to 8, wherein load supporting auxiliary members are provided between the shell noncontact portions of the elastic rings and the circular shell.

10. The run-flat support member according to claim 9, wherein the auxiliary members are made of synthetic resin.

* * * * *